Figure 1:
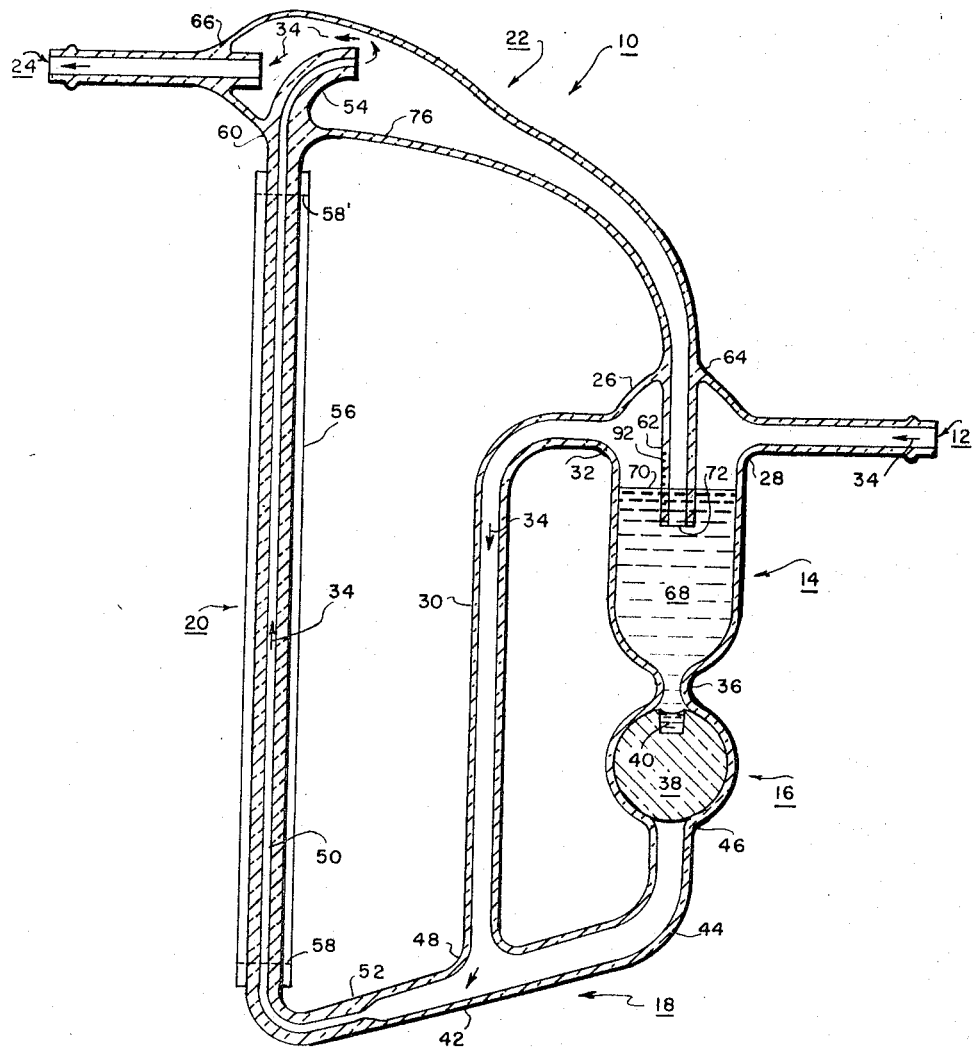

June 6, 1967  F. E. WELLS  3,323,362
POSITIVE DISPLACEMENT FLOWMETER
Filed Oct. 14, 1964  2 Sheets-Sheet 1

INVENTOR.
FREDERIC E. WELLS
BY
ATTORNEYS ent Office 3,323,362
Patented June 6, 1967

3,323,362
POSITIVE DISPLACEMENT FLOWMETER
Frederic E. Wells, Huntsville, Ala., assignor to the United States of America as represented by the Administrator of the National Aeronautics and Space Administration
Filed Oct. 14, 1964, Ser. No. 403,959
3 Claims. (Cl. 73—194)

The invention described herein may be manufactured and used by or for the Government of the United States of America for governmental purposes without the payment of any royalties thereon or therefor.

This invention relates to a flowmeter for measuring extremely low flows of a fluid and, more particularly, to a positive displacement flowmeter of the portable and self calibrating type.

The act of measuring small flow rates of a fluid accurately has always been an extremely difficult task beset by numerous hardships and pitfalls that often tends to cast doubt upon those results obtained by prior known methods and systems. These difficulties coupled with the continued increase in reliability demands, and the continual refinement of checkout methods as used, for example, in the aerospace industry, has resulted in a great deal of effort and expense being expended toward improving existing precision flowmeters. Nevertheless, most of these measuring systems for precise measurements of very small flows continue to remain rather complex since they require extensive observations, considerable set up time, are not readily portable and must be separately calibrated for each different gas. Those systems that have been developed which are readily transported, reasonably accurate and easily operated generally have the disadvantage of requiring a source of operating potential since they operate on a thermo electric phenomenon and depend on electronic circuits for obtaining readouts. The so called Hastings Flowmeter which utilizes the "hot wire" principal is typical of this group of electrically operated systems.

Besides the disadvantage of requiring a source of electrical potential, these electrically operated flowmeters are extremely difficult to calibrate in the face of electronic component "aging." Furthermore, it has been found to be difficult to interpret the readings obtained with such systems when a gas is being measured that is different from that for which the system was initially calibrated. This problem exists because the electronic flowmeter systems usually depend on a comparative calibration (being directly compared with a standard) and are affected by one or more of the physical characteristics of the gases such as density, specific heat, viscosity, etc. When the makeup of the gases being measured is unknown, and thus cannot be compared with previously prepared tables, this interpretation of the readings obtained becomes a virtually impossible task.

According to the present invention it has been found that a precision flowmeter can be produced which has none of the inherent limitations of the electronic type flowmeter, nor of the roto, orifice or water dependent type fluid flow measuring systems. This flowmeter consists of a liquid dispenser that releases a measured quantity of a sealing liquid or fluid from a reservoir into a metering tube of a known volume located between the inlet and outlet port of the system. Since the liquid forms a slug that seals off the inlet port from the outlet port, the liquid will be forced through the metering tube at a rate dependent on the flow of fluid into the system. The time required for the liquid slug to be transported a predetermined distance through the metering tube determines the flow rate of the fluid under test. Once the liquid slug leaves the metering tube it is returned to the reservoir through a separator and return unit thus rendering the system ready for immediate reuse.

Accordingly, the primary object of this invention is to provide a precision flowmeter having an inherent calibration factor.

Another object of this invention is to provide a precision flowmeter which is not affected by the physical characteristics of the fluid being metered.

Another object of this invention is to provide positive displacement precision flowmeter which is not dependent upon electronic circuitry for proper operation.

Still yet another object of this invention is to provide a rapid operating precision fluid flowmeter which is capable of measuring widely varying rates of flow and does not contaminate or affect the physical characteristics of the fluid under test.

Figure 2:
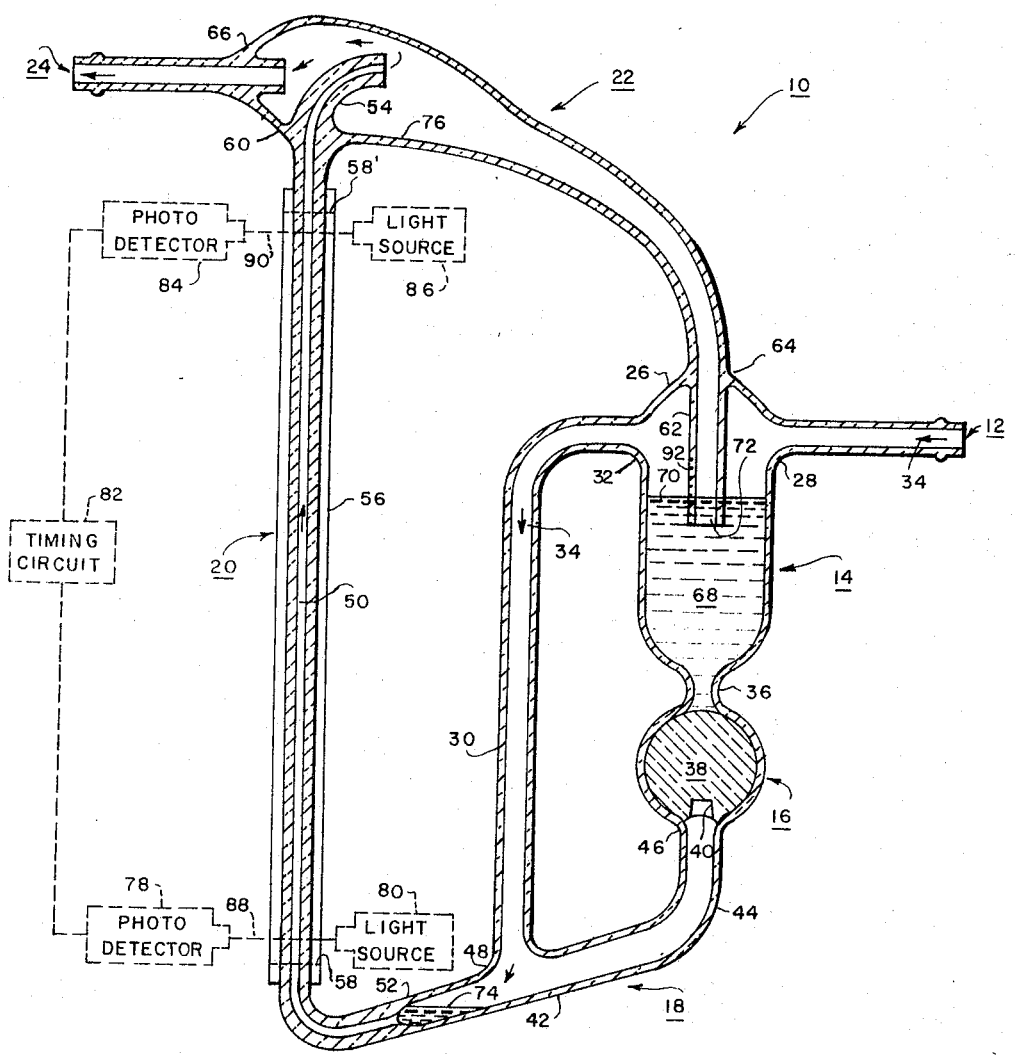

These and other objects and advantages of this invention will be more apparent upon reference to the following specification, appended claims and drawings wherein:

FIGURE 1 is a cross sectional view of one form in which a precision fluid flowmeter can be constructed in accordance with this invention; and FIGURE 2 is a view similar to FIGURE 1 but showing the liquid sealing slug ready for movement through the metering tube under the influence of the pressure being exerted by the fluid under test.

With continued reference to the accompanying figures wherein like numerals designate similar parts throughout the various views, and with initial attention directed to FIGURE 1, reference numeral 10 designates a precision flowmeter designed to monitor fluid flows of extremely low rates. The flowmeter 10 consists generally of an inlet port 12, fluid reservoir 14, metering dispenser 16, equilibrium chamber 18, metering tube 20, fluid separator and return 22 and outlet port 24. All of these parts or units can be made of glass or any other suitable material which is impervious to gases and will, in the case of the metering tube, permit the movement of a liquid slug to be observed and timed.

To increase the strength of the flowmeter, and thus increase its resistance to breakage, the hollow tubular inlet port 12 is formed into the top or upper portion 26 of the cylindrical fluid reservoir 14 at 28 while an L shaped outlet tube 30 is also secured at 32 to the upper portion of the reservoir. As is apparent, the inlet port 12 and outlet tube 30 are hollow conduits so that the gases from the inlet port will flow unrestricted through the reservoir and into the outlet tube as indicated by the arrow heads 34. The metering dispenser 16, which is preferably of the rotating fluid tight stem type, is joined by a neck 36 to the bottom of the fluid reservoir 14. For purposes that will be more fully explained hereinbelow the rotating stem portion 38 of the dispenser has a pocket or a recess 40 of a predetermined size formed on the outer periphery thereof.

The equilibrium chamber 18, which has an internal volume sufficient to remove any "hydraulic hammering" effect and thus acts as an "accumulator," is preferably formed in the shape of a modfied L with the lower leg 42 thereof sloped in a downward direction while the upper leg 44 is joined at 46 to the outlet of the metering disspenser 16. The lower end of the outlet tube 30 is connected at 48 to the lower leg 42 of the chamber for reasons that will be more fully explained hereinafter.

Metering tube 20 is preferably formed of a clear material such as glass and the smooth restricted passageway 50 which makes up the measured volume of this conduit should preferably be substantially straight for best operating results. The substantially U shaped bottom end of the conduit tube 20 is connected at 52 to the lower leg 42 of the equilibrium chamber 18 while the top of the tube is slightly curved at 54 and projects into the interior of the fluid separator and return 22. A scale or marker board 56 is secured behind the transparent metering tube 20 and has indicator marks 58 formed thereon. To prevent any escape of the fluid under test from around the curved end 54 of the metering tube 20, the wall of the fluid separator 22 and the tube are secured together in a gas tight manner at 60.

The lower end of the return tube 62 of the separator and return unit 22 extends into the top 26 of the fluid reservoir 14 and is secured thereto in a gas tight manner at 64. The outlet port 24 of the precision flowmeter 10 is connected at 66 to the top of the fluid separator and return 22 while the sealing fluid or liquid 68 of the flowmeter is held within the reservoir 14. Preferably this sealing fluid 68 is mercury although any liquid having a high surface tension and low wetting properties can be employed.

As can be seen in the figures, the mouth 72 of the return tube 62 must be below the surface of the liquid 70 to ensure that the gases under test, which are flowing into the system through inlet port 12, will pass from the measuring reservoir 14 through the outlet tube 30, equilibrium chamber 18, metering tube 20, and the fluid separator and return 22 to the outlet port 24 in the manner indicated by the arrow heads 34. This flow path is assured as long as the mouth 72 of the return tube 62 is under the level 70 of the liquid since the resistance of the flow of gases through the system in this desired direction is practically negligible in comparison to that required to force the liquid mercury 68 up into the separator through the mouth 72.

An alternative approach to this flow problem would be to connect the inlet to the flowmeter directly to the equilibrium chamber 18 and omit the conduit 30. Such a system is not as rigid, however, as the flowmeter system illustrates since the conduit 30 serves to "brace" or strengthen the equilibrium chamber 18 to the reservoir 14.

The operation of the precision flowmeter 10 can be explained substantially as follows:

With the source of gases to be tested connected to and flowing through the system from the inlet port 12 to the outlet port 24, the rotating stem portion 38 of the metering dispenser is rotated through one revolution by any suitable operating mechanism such as a handle (not shown). When the pocket 40 in the stem 38 passes the mouth of the equilibrium chamber 18, as shown in FIGURE 2, a precision quantity of the sealing fluid from the reservoir 14, which was carried in the pocket, will be released into the chamber. Due to its high surface tension the released sealing fluid, which is preferably mercury, will form into a "slug" 74 and flow down the sloped lower leg 42 on the equilibrium chamber until it engages against the bottom end of the passageway 50 of the metering tube in the manner shown in FIGURE 2. The quantity of the mercury dispensed in the equilibrium chamber 18 is chosen so that the length of the slug formed is approximately equivalent to the diameter of the metering tube 20. An excessive amount of mercury or any other sealing fluid being used to form the slug should be avoided since it can cause the slug to move in an erratic manner through the metering tube 20.

As can be seen, with the mercury slug 74 positioned over the input side of the passageway 50, the gas on the inlet side of the flow meter will be isolated from the outlet port 24. Thus the mercury slug will be forced up into and through the passageway 50 by the flow of the gases into the flow meter through inlet port 12. The mercury slug will continue through the metering tube 20 until it reaches the separater 22 at which point the slug will leave the end of the passageway 50, drop onto the sloped lower surface 76 of the return tube 62 and thus be returned to the mercury pool 68 for reuse. As will be apparent, the gases will flow continually from the outlet port 24 at all times during this metering procedure.

The measuring function of the flowmeter 10 is performed by measuring the time required for the slug 74 to pass from the lower scale mark 58 to the upper scale mark 58′. Since the volume of the passageway 50 within the metering tube 20 has been previously determined by measuring the cross sectional area and distance of the passageway from one scale mark to the other, the flow of the gases through the flowmeter is easily and quickly determined by solving the following equation:

$$\text{Flow rate} = V/T$$

where $V$ = volume between scale marks 58 and 58′, and
$T$ = time required for the mercury slug 74 to pass between the scale marks.

As will be apparent, the fundamental accuracy of the flowmeter is a function of bore or passageway diameter accuracy, scale mark dimensional accuracy, and timing accuracy. In actual practice it has been found that the critical dimensions can be determined within plus or minus 0.02% and timing accuracy to within plus or minus 1% at worst with a skilled operator observing and timing. However, this timing accuracy can easily be improved by a factor of 10 where a photo electric-timing circuit or other electronic scale markers, as represented by the broken lines 78–86 in FIGURE 2, is used in place of the scale markers 58–58′. As the slug 74 passes the lower photo detector and light source 78–80, respectively, of such an electric timing circuit, the circuit will be turned on and will continue to operate until the slug reaches the upper photo detector and light source 84–86 at which time the circuit will be turned off. Therefore the time elapsed between when the first beam of light 88 is broken to turn on the timing circuit 82 until the second light beam 90 is broken to stop the timing circuit will give the precise travel time of the slug through the metering tube 20 and thus the flow rate of the gases being measured.

The working accuracy of the flowmeter is further affected by the use or absence of a correction for the actual absolute pressure and temperature of the gas flowing into the flowmeter. The pressure correction, which if not taken into account can approach an error of 5%, must include a true barometer reading plus the back pressure imposed by the slug 74 being raised through the metering tube 20. This back pressure can be determined by reading the height of the sealing fluid column in the return tube 62 on the scale 92 etched thereon as compared to the reservoir level. However, due to the overall design of the flowmeter 10, the back pressure produced by the gases flowing through the meter will tend to compensate for a barometer pressure of less than 760 mm. Thus it is seen that the flowmeter has a built in compensating feature for barometer pressures falling within the most common range differences.

The temperature correction, which will seldom involve an error in excess of 20%, can be obtained by observing ambient temperature in the area where the test is being performed. The mass flow through the meter is so low that it can be assumed to be the same temperature as the temperature of the work area.

In those instances where these additional factors of pressure and temperature are taken into consideration, the following equation is used to compute the flow rate of the gases through the flowmeter 10;

$$\text{Flow rate} = \frac{V}{T} \times \frac{Pm}{Ps} \times \frac{Ts}{Tm}$$

where:

$V$ = volume between scale marks
$T$ = time required for the slug to pass between the scale marks
$Pm$ = pressure in the flowmeter (absolute)
$Ps$ = standard pressure (absolute)
$Tm$ = temperature in the flowmeter (absolute)
$Ts$ = standard temperature (absolute)

Accuracy obtained with this equation will be dependent on the quality of the measurements and, under normal laboratory practice, will be within plus or minus 0.5%. When accuracy requirements are less, the pressure and temperature terms in the equation can be dropped and the error will normally be less than plus or minus 5.0% of the reading obtained.

From the foregoing it can be seen that a novel precision flowmeter has been described which has no lower limit of sensitivity since it is a positive displacement type system. No electrical circuit need be used within the flowmeter since a normal two minute timing cycle will measure a flow rate of 0.014 standard cubic inch per minute at an accuracy of plus or minus 5%. However, when higher accuracies are desirable the use of a simple photodetector timing circuit will increase the accuracy of the flowmeter by a factor of 10 or more. Furthermore, an inherent calibration factor is built into the flowmeter and its operation is not affected by any of the physical characteristics of the gases being metered. These factors plus the simple, rugged construction of the flowmeter makes it ideal for use where a highly accurate, portable fluid flow measuring system is required.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A positive displacement flowmeter for measuring the flow rate of a flowing fluid comprising:
   (a) conduit means mounted in a substantially vertical position, said conduit means having a passageway of a known volume formed through at least a portion thereof;
   (b) tubular inlet means connected at one end to the lower end of said conduit means;
      (1) the free end of said inlet means being located at a level above said lower end of said conduit means;
      (2) said free end being adapted to be connected to the source of said flowing fluid;
   (c) reservoir means for receiving and holding a measuring fluid having a high surface tension;
   (d) dispenser means connected between the outlet of said reservoir means and said tubular inlet means for releasing when actuated a precisely measured quantity of said measuring fluid into said inlet means so that said released fluid forms a liquid slug which seals said conduit means thus resulting in said slug being moved through said passageway in a given time by said flowing fluid thereby giving an indication of the flow rate of said flowing fluid;
   (e) return means operatively connected between the upper end of said conduit means and said reservoir means for automatically returning said liquid slug to said reservoir after said slug has passed through said passageway;
      (1) said return means comprising a tube operatively connected at one end to the upper end of said conduit means and at the other end to said reservoir means;
   (f) said reservoir means being located at a lower level than the upper end of said conduit whereby said liquid slug flows through said tube under the influence of gravity;
   (g) said other end of said tube projecting below the surface of said measuring fluid in said reservoir means thereby preventing escapement of any of said flowing fluid through said tube.

2. A positive displacement flowmeter for measuring the flow rate of a gas comprising:
   (a) transparent metering tube means mounted in a substantially vertical condition;
      (1) said metering tube means having a passageway of a known volume formed through at least a portion thereof;
   (b) liquid reservoir means for receiving and holding a sealing fluid;
      (1) said sealing fluid having a high surface tension so that said fluid will form a slug when released in a measured quantity;
   (c) metering dispenser means connected to said liquid reservoir means for releasing a precisely measured quantity of said sealing fluid from said reservoir means;
   (d) equilibrium chamber means connected between said metering dispenser means and the lower end of said metering tube means for transporting said slug formed by the released measured quantity of said sealing fluid into the lower end of said passageway;
   (e) inlet port means connected to said equilibrium chamber means for conducting said gas into said flowmeter whereby said slug is moved through said passageway thereby indicating the flow rate of said gas;
   (f) means for automatically returning said slug to said liquid reservoir means after said slug has left said passageway;
   (g) said metering dispenser means including a rotating stem having a recess formed therein whereby a measured quantity of said sealing fluid is carried in and released by said rotating stem as said recess passes the mouth of said equilibrium chamber means.

3. A positive displacement flowmeter according to claim 2 wherein said inlet port means is connected through said liquid reservoir means to said equilibrium chamber means.

References Cited

UNITED STATES PATENTS

| | | | |
|---|---|---|---|
| 3,148,689 | 11/1964 | Bean et al. | 137—268 X |
| 3,158,888 | 12/1964 | Ericson | 137—268 X |
| 3,248,941 | 4/1966 | McArthur | 73—194 |

OTHER REFERENCES

Ehlers: "Constant-Pressure Leak-Rate Gauge"; Univ. of Calif. Radiation Lab., UCRL–3951; Sept. 1957; printed for the U.S. Atomic Commission; 4 pages.

RICHARD C. QUEISSER, *Primary Examiner.*

E. D. GILHOOLY, *Assistant Examiner.*